UNITED STATES PATENT OFFICE.

SIGMUND L. SIGAL, OF PITTSBURG, PENNSYLVANIA.

FOOD COMPOUND OR CONDIMENT.

934,763.

No Drawing.

Specification of Letters Patent. Patented Sept. 21, 1909.

Application filed December 23, 1908. Serial No. 468,902.

*To all whom it may concern:*

Be it known that I, SIGMUND L. SIGAL, of Pittsburg, in the county of Allegheny and State of Pennsylvania, have invented certain new and useful Improvements in Food Compounds or Condiments, of which the following is a specification.

My invention relates to a new and improved food compound or condiment in the nature of a sauce or relish for table and culinary use.

The prime object of my invention is, to provide a condiment containing a large percentage of horse radish in which the character of the horse radish while being maintained to a great extent is so modified that it is rendered more agreeable to the taste than has heretofore been the case.

A further object of the present invention is to provide a healthful and stable relish.

With these ends in view my condiment consists of a mixture of raw horse radish, cooked beets, white wine vinegar, granulated sugar, and table salt.

In carrying out my invention I first cook a sufficient quantity of beets, then allow the beets to cool and after they are cold grind or grate the beets. The beets thus prepared are mixed with ground or grated raw horse radish. When the finely ground beets and horse radish are mixed, vinegar, sugar and salt are added and the ingredients stirred to effect a thorough mixture of the same.

The proportions which I prefer to employ in the preparation of my food compound or condiment are as follows:

| Raw horse radish | 38 parts by measure |
| Cooked beets | 18 " " " |
| White-wine vinegar | 39 " " " |
| Granulated sugar | 4½ " " " |
| Common table salt | ½ " " " |

I am aware that condiments of the class to which my invention relates should not be composed of ingredients of such a nature that the compound will soon spoil by exposure to the air and that the condiment should have a considerable degree of stability. After numerous experiments I succeeded in accomplishing the above mentioned objects without the employment of deleterious preservatives.

What I claim is:

A condiment composed of grated horse radish, grated cooked beets, vinegar, sugar, and salt, in the proportions substantially as specified.

In testimony whereof I affix my signature in presence of two witnesses.

SIGMUND L. SIGAL.

Witnesses:
A. C. WAY,
W. G. DOOLITTLE.